(12) United States Patent
Meda et al.

(10) Patent No.: US 6,254,927 B1
(45) Date of Patent: Jul. 3, 2001

(54) LIQUID RELEASE AGENT COMPOSITION AND SHIM PROCESS

(75) Inventors: Haney Samuel Meda, Huntington Beach; Romeo Racsa Manansala, Rancho Palos Verdes, both of CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/430,047

(22) Filed: Oct. 29, 1999

Related U.S. Application Data

(62) Division of application No. 09/100,847, filed on Jun. 19, 1998, now Pat. No. 6,063,177.

(51) Int. Cl.$^7$ ........................................................ B05C 1/16
(52) U.S. Cl. .......................... 427/135; 427/133; 427/417; 427/419.7
(58) Field of Search ........................... 427/133, 135, 427/419.7, 419.2, 416, 417

(56) References Cited

U.S. PATENT DOCUMENTS

| | | |
|---|---|---|
| 1,580,966 * | 4/1926 | Dales et al. . |
| 3,855,165 | 12/1974 | Aron ................................. 260/23.7 |
| 3,947,571 | 3/1976 | Murphy et al. ........................ 424/64 |
| 4,035,514 | 7/1977 | Davis ................................. 424/365 |
| 4,388,263 * | 6/1983 | Prunty ................................ 264/257 |
| 4,609,511 | 9/1986 | Fischer et al. ......................... 264/51 |
| 4,808,323 | 2/1989 | Fisher et al. .......................... 252/15 |
| 5,133,804 | 7/1992 | Culpon, Jr. ........................... 106/267 |
| 5,543,159 * | 8/1996 | Iltgen ................................. 425/543 |

* cited by examiner

Primary Examiner—Shrive Beck
Assistant Examiner—Kirsten A. Crockford
(74) Attorney, Agent, or Firm—Terry J. Anderson; Karl J. Hoch, Jr.

(57) ABSTRACT

An improved shimming process and release composition for filling the gap between a releasable composite skin and a supporting body with a liquid shim material, using a novel viscous liquid release composition free of volatile vehicle. The liquid release composition is viscous and easy to apply by brushing or wiping, and enables complete and clean release of the composite skin without delamination. The release composition is easy to clean from the parted surfaces of the cured shim material on the composite skin and the supporting body.

5 Claims, No Drawings

LIQUID RELEASE AGENT COMPOSITION AND SHIM PROCESS

This application is a Division of Ser. No. 09/100,847 filed Jun. 19, 1998, U.S. Pat. No. 6,063,177.

BACKGROUND OF THE INVENTION

1. Field of the Invention

The present invention relates to improved release agent compositions, such as mold release agents or parting agents, and processes in which such agents are applied to one surface, such as mold surface or backing surface, to enable or facilitate the release or separation of the surface of a molded or formed body, such as of cured or solidified molding resin or elastomer, from the mold surface or backing surface without damage to either surface.

A preferred embodiment of the present invention relates to the filling of gaps between aircraft bulkheads and inlet duct surface skins of composite materials, which skins must be removed to inspect for voids in the cured gap-fill or shim layer and for the application of sealant before the composite skins and bulkhead as reassembled.

2. State of the Art

A wide variety of mold release agents are known in the art, most of which are solid additives to resinous molding compositions which melt and exude to the surface of the molded body to facilitate release from the surface of the mold after the molding cycle.

It is also known to apply volatile organic solvent solutions or aqueous dispersions or emulsions of release agent composition to mold surfaces or backing surfaces prior to the curing of resinous shim or gap-fill compositions, such as polyurethane foam compositions, or ceramic compositions thereagainst and reference is made to U.S. Pat. Nos. 4,609,511 and 5,133,804 respectively, for their disclosure of such processes and mold release compositions.

The use of mold release compositions containing major amounts of volatile vehicles is objectionable because of the internal pressures caused by the evaporation of the vehicle, the formation of voids in the molded body and the dangers introduced in the case of volatile organic vehicles.

The conventional method for shimming or filling the gaps between composite inlet duct surface skins and aircraft bulkheads involves applying Teflon ® polytetrafluoroethylene film or tape to the bulkhead surface, coating the film or tape with a spray wax release agent, applying thereover a layer of liquid curable shim or gap-fill composition such as a curable silicone elastomeric caulk layer, and applying thereover a conforming composite skin section such as an inlet duct section. In order to force and distribute the liquid shim material into the gap between the composite skin and the bulkhead, a conventional clamping fixture with an inflatable bladder is installed over the skin and inflated to compress the skin against the bulkhead and distribute the liquid shim, as needed, to fill the gap. Then the liquid shim composition is cured, such as by application of heat, to solidify the shim material. After cooling, the bladder tool and composite skin section can be separated from the bulkhead to inspect for voids in the cured shim layer.

The major disadvantage of the conventional process and release agents is the unsatisfactory release provided by the Teflon ®/wax, sometimes resulting in damage and delamination of the composite skin when the cured shim material does not release completely from the bulkhead. Also, the Teflon®/wax requires two-step application, and is difficult to remove from the surface of the cured shim layer.

Conventional release agents and lubricating agents contain waxes and fatty acids, oils such as vegetable and/or mineral axes and oils and/or normally solid lubricants such as petrolatum waxes, aliphatic alcohols, including cetyl alcohol, and a wide variety of mixtures of such materials, as disclosed by U.S. Pat. Nos. 4,609,511 4,035,514 and 4,808,323. Such compositions are unsatisfactory for a variety of reasons including complexity of formulations, presence of liquid vehicles such as water or volatile organic solvents, and other properties such as fluidity which render the compositions difficult or messy to apply uniformly by brushing or wiping and/or which do not provide satisfactory release properties to permit complete release of a composite body from a cured shim material without any delamination.

SUMMARY OF THE INVENTION

The present invention provides an improved shimming process and release composition for filling the gap between a releasable composite skin and a supporting body with a liquid shim material, using a novel viscous liquid release composition free of volatile vehicle, and to the novel viscous liquid release composition which is easy to apply by brushing or wiping, and which enables complete and clean release of the composite skin without delamination, and which is easy to clean from the parted surfaces of the cured shim material on the composite skin and the supporting body.

The present viscous liquid release agent compositions comprise mixtures of a major amount by weight of mineral oil and a minor amount by weight of a $C_{12}$–$C_{20}$ aliphatic alcohol, preferably cetyl alcohol ($C_{16}$), which is soluble or miscible with the mineral oil to form a homogeneous viscous liquid mixture.

DETAILED DESCRIPTION

The present viscous liquid agent compositions consist essentially of two ingredients, namely a liquid mineral oil and a $C_{12}$–$C_{20}$ aliphatic alcohol, which is a solid. The release agent compositions are formed as homogeneous, viscous liquid compositions by melting a minor amount by weight, preferably between 25% and 45% and more preferably between about 30% and 37% by weight of the solid aliphatic alcohol, such as cetyl alcohol, and adding thereto a major amount by weight of the liquid mineral oil, preferably between about 55% and 75% more preferably between about 63% and 70% by weight thereof. The formed composition is a homogeneous solution of the aliphatic alcohol in the mineral oil, does not separate after cooling and is a highly viscous liquid at ordinary room temperature which can be applied to the release surface such as the outer surface of the supporting body or bulkhead of an aircraft body, without running or draining from said surface or from an application brush or wiping pad or cloth under the effects of gravity.

The present viscous liquid release compositions are suitable for use in all known applications in which conventional release agents are applied to a surface intended to be released from another surface, most commonly a mold surface, intended to be released from a body molded of cured or set resin, polymer or elastomer after the molding cycle is completed and the mold is opened.

However the present release compositions were formulated for aircraft use in which the mold surface is the outer surface of a supporting body or bulkhead, and the molded body is a layer of elastomer which is applied as a curable liquid shim layer to the supporting body such as a bulkhead, fuselage or tail section of an aircraft The composite laminate skin is pre-formed in conventional manner, such as from a plurality of layers of curable epoxy resin-impregnated graphite fabric, and is contoured to correspond to the contour of the supporting body to which it is to be applied. It is necessary to fill any gap between the inner surface of the composite skin and the outer surface of the supporting body to eliminate any air spaces therebetween. This is accomplished by the application of a curable liquid shim composition, such as an elastomeric silicone gap-fill composition, to the surface of the supporting body, after the application thereto of the present viscous release agent composition, followed by compression of the skin section against the supporting body to cause the liquid shim elastomer to flow, distribute and fill any airspace gap between the composite skin and the supporting body, displacing any air and exuding any excess liquid shim composition.

Finally the assembly is cured at ambient temperatures to transform the skin material into a solidified elastomer layer bonded to the composite skin section. The composite skin section and shim layer can be lifted off the supporting body, cleanly and without any damage to the laminations of the composite skin section. Such removal enables the cured elastomer shim layer to be visually inspected for possible voids, and for the application of sealant when the skin sections are re-assembled with the supporting body.

The present viscous release agent compositions are homogeneous, non-running, safe for use in enclosed or confined work areas and, most importantly, provide excellent release from the cured elastomeric surfaces of shim layers, such as of silicone polymers. This is critically important in the case of composite skin laminates where any delamination can weaken or destroy the integrity of skin panels, leading to failure during flight or requiring rework repair. The viscous liquid release agent compositions can be brushed or wiped onto the bulkhead surface and can flow and penetrate into recessed or uneven surfaces when the liquid shim composition is compressed between the composite skin panel and the bulkhead surface. The liquid shim elastomer normally has strong adhesive properties for all surfaces, including the inner surface of the composite laminate skin panel, but is prevented from bonding to the surface of the bulkhead by the present release composition.

The necessary compression to distribute the liquid shim composition uniformly between the skin panel and the bulkhead, filling all voids and extruding any excess, is provided by means of conventional inflatable clamping fixtures known for this purpose.

It should be understood that the foregoing description is only illustrative of the invention. Various alternatives and modifications can be devised by those skilled in the art without departing from the scope of the present invention. Accordingly, the p resent invention is intended to embrace all such alternatives, modifications and variances which fall within the scope of the appended claims.

What is claimed is:

1. A process for filling the gap between the surfaces of first and second bodies while enabling the bodies to be separated from each other, comprising coating the surface of the first body with a liquid release agent composition comprising a homogeneous viscous solution containing between about 25% and 45% by weight of a solid $C_{12}$–$C_{20}$ aliphatic alcohol dissolved in between about 55% and 75% by weight of a liquid mineral oil, based on the total weight of said homogeneous viscous solution; coating the surface of the release agent layer or of the second body with a layer of liquid, curable elastomer composition; compressing the layer of liquid elastomer composition between the surfaces of said first and second bodies to fill the gap therebetween; curing the layer of elastomer composition to form a solidified shim layer, and separating said bodies, with the solidified shim layer bonded to the surface of said second body and cleanly released from the surface of said first body.

2. A process according to claim 1 in which said second body is a body formed of composite laminate.

3. A process according to claim 1 in which said liquid elastomer comprises a silicone elastomer.

4. A process according to claim 1 in which said release agent comprises between about 30% and 37% by weight of the aliphatic alcohol and 63% to 70% by weight of the mineral oil.

5. A process according to claim 1 in which the aliphatic alcohol is cetyl alcohol.

* * * * *

UNITED STATES PATENT AND TRADEMARK OFFICE
CERTIFICATE OF CORRECTION

PATENT NO. : 6,254,927 B1
DATED : July 3, 2001
INVENTOR(S) : Meda et al.

It is certified that error appears in the above-identified patent and that said Letters Patent is hereby corrected as shown below:

<u>Column 1,</u>
Line 6, add the following statement as the first paragraph of the specification:

-- STATEMENT OF GOVERNMENT RIGHTS

This invention was made with Government Support under contract N00019-96--C-0065 awarded by the United States Navy. The Government has certain rights in this invention. --

Signed and Sealed this

Thirty-first Day of December, 2002

JAMES E. ROGAN
*Director of the United States Patent and Trademark Office*